United States Patent Office 3,417,020
Patented Dec. 17, 1968

3,417,020
CARBONYLATED ALIPHATIC POLYMERS
Albert F. Preuss, Willow Grove, and Robert Winslow White, Jenkintown, Pa., assignors to Rohm and Haas Company, Philadelphia, Pa., a corporation of Delaware
No Drawing. Original application Apr. 18, 1963, Ser. No. 273,837. Divided and this application Mar. 8, 1967, Ser. No. 621,411
3 Claims. (Cl. 252—52)

ABSTRACT OF THE DISCLOSURE

This invention concerns oil-soluble aliphatic hydrocarbon polymers having a carbonyl group, a method for their preparation, and lubricating compositions containing them. As olefinic polymers there may be used any of the polymers formed from olefins containing three to twelve carbon atoms. The process for preparing the oil-soluble saturated aliphatic hydrocarbon polymers of this invention comprises (1) reacting an olefinic polymer of a molecular weight of about 300 to 5,000 with ozone, the polymer being in a liquid state, whereby an ozonolysis product is formed, and (2) reducing the resulting ozonolysis product until a carbonyl group is formed thereon.

Cross references to related applications

This application is a division of U.S. application Serial No. 273,837, filed April 18, 1963 (now abandoned).

Background of the invention

Lubricating oils have been synthesized by polymerizing olefins, as with aluminum chloride and related catalysts. It has also been proposed to hydrogenate such oils to improve their stability. Polymers of isobutylene have been prepared and used in oils to increase viscosity. Such polymers, however, are not fully compatible with various synthetic lubricants and tend to depolymerize at high temperatures.

Detailed description of the invention

This invention concerns oil-soluble aliphatic hydrocarbon polymers having a carbonyl group, a method for their preparation, and lubricating compositions containing them.

The process for preparing the oil-soluble saturated aliphatic hydrocarbon polymers of this invention comprises (1) reacting an olefinic polymer of a molecular weight of about 300 to 5,000 with ozone, the polymer being in a liquid state, whereby an ozonolysis product is formed, and (2) reducing the resulting ozonolysis product until a carbonyl group is formed thereon.

As olefinic polymers there may be used any of the polymers formed from olefins containing three to twelve carbon atoms, preferably three to five carbon atoms, by additional polymerization from pure olefins, whether gaseous or liquid under normal conditions. The usual source of olefins is from cracking petroleum and other hydrocarbons. Fractions containing considerable proportions of olefinically unsaturated open-chained hydrocarbons are readily obtained. The importance of removal of sulfur, cyclic compounds, and other impurities is well understood. Olefins from propylene upward to dodecene are readily available and mixtures may be used or fractions may be taken for polymerization. Mixtures of various olefins from propylene to pentenes, for example, may be used or a mixture of the various butenes is especially useful in providing polymers. As is known, propylene can give useful polymers with an increased proportion of catalyst, while pentenes are slower to polymerize than olefins of smaller size. Ethylene may be utilized as a minor component in conjunction with other olefins, oily polymers from propylene and ethylene are known, for example. The butene fraction is most commonly employed and comprises both straight-chained and branched butenes. If desired, polymers may be prepared from isobutylene, but for purposes of this invention such separation or isolation is not essential. Thus, the polybutenes of commerce, derived from mixtures are especially useful. The olefinic polymers used as starting materials should have molecular weights of about 300 to 5,000 for purposes of this invention. They vary from rather fluid liquids to quite viscous liquids at normal temperatures.

Ozonolysis of a polyolefin or a mixture of polyolefins is effected by bringing polyolefin in contact with polyolefin in a liquid state. Ozone is usually supplied diluted with oxygen or air. Since the polyolefins tend to be viscous, it is desirable to extend them with one or more solvents which are inert to ozone under the conditions of reaction.

Typical solvents include liquid aliphatic hydrocarbons, such as hexane, heptane, octane, mixture of alkanes, petroleum ethers, benzenes, toluene, xylene, aromatic naphthas, chlorinated hydrocarbons such as dichloroethane, tetrachloroethane, trichloroethane, carbon tetrachloride, or trichloropropane, esters such as ethyl or butyl acetate, ethyl propionate, dibutyl sebacate, di-2-ethylhexyl sebacate, di-n-octyl azelate or pimelate, or dinonyl pimelate, azelate, or sebacate.

In a particularly effective system for reacting polyolefin and ozone a liquid alcohol may be used. Desirably there is present at least one mole of alcohol per mole of polyolefin, for an alcohol reacts with the ozonolysis product and aids in the reaction. Useful alcohols include methyl, ethyl, propyl, isopropyl, butyl, hexyl, and octyl alcohols as well as mixtures of alcohols.

Reaction of olefin and ozone is effected between −80° C. and 60° C., preferably between about −30° C. and 30° C. Ozone is supplied until at least 10%, preferably 25%, of the olefinic linkages of the polyolefins have been reacted and reaction may be continued until one mole of ozone has been used per mole of polymer.

It is not necessary to isolate the ozonolysis products, although this may be done if desided. Also, if desired, the progress of the reaction may be followed by determination of peroxide.

After ozonolysis has been effected, the resulting product is reduced. Chemical reduction may be employed, as with nascent hydrogen or with a reducing agent such as stannous chloride, titanium trichloride, sulfur dioxide, a bisulfite or hydrosulfite. Nascent hydrogen may be supplied by reaction of acid on a metal such as zinc or iron. Also, preferably hydrogen may be used in the presence of a hydrogenation catalyst, such as platinum, palladium, or activated nickel.

Hydrogen is supplied until about one mole of hydrogen is consumed per mole of polyolefin. Temperature of hydrogenation may vary from about 0° C. to 150° C. depending upon the catalyst. Pressures may vary from atmospheric to 500 lbs. per square inch or more. Hydrogenation of the ozonolysis product is best accomplished in the presence of a solvent.

Catalyst is separated from the reaction mixture and solvent may be volatilized therefrom by heating. If desired, the product may be taken up in an oil or synthetic lubricant which is conveniently added before removal of volatile materials. In this way concentrated solutions of product in oil or other lubricants are readily prepared. Also, this procedure provides a simple way to transfer a desired amount of carbonylated product to any lubricating composition.

Further details of preparation and use are given in the following examples which are presented for purposes

Example 1

(a) A solution is prepared from 200 parts of hexane and 42 parts of a polyolefin having a molecular weight of 800 and prepared from a mixture of olefins which are chiefly 1-butene and isobutylene. A stream of oxygen containing ozone is passed into the solution at about room temperature (25° C.) for 76 minutes. The stream supplied 0.69 millimole of ozone per minute. There results a solution of ozonolyzed polyolefin.

When a sample of this solution is heated, solvent is vaporized to give an oily residue. This is heated at 65 to 70° C. to decompose peroxides which may be present. The resulting product has an acidity of 0.118 milliquivalent per gram.

(b) The bulk of the above solution of ozonolyzed product is mixed with one part of platinum dioxide and cooled to about —45° C. Hydrogen is admitted and the reaction mixture changes in temperature to about 0° C. Hydrogen is vented, catalyst is filtered off, and solvent is evaporated under reduced pressure to give a residue. Examination of this by infrared absorption shows the presence of a carbonyl group. The residue is soluble in lubricating oils and in synthetic lubricants such as di-2-ethyl-hexyl sebacate. The residue at room temperature is a viscous liquid.

Example 2

(a) There are mixed 150 parts (0.125 mole) of a commercial polybutene of a molecular weight of about 1200, 300 parts of n-butanol, and 300 parts of n-hexane. The mixture is cooled to about 10° C. and a stream of oxygen-containing ozone is passed therethrough at the rate of 1.45 millimoles of ozone per minute for 86 minutes.

(b) The resulting solution is treated with about one part of platinum and cooled to —50° C. Hydrogen is passed into the mixture while the temperature thereof rises to about 0° C. About 0.12 mole of hydrogen is absorbed. Catalyst is filtered from the treated solution, which is then heated to 75° C. under reduced pressure, which is finally lowered to 3 mm. absolute pressure. There is obtained 132.5 parts of product which is found by infrared analysis to contain a carbonyl group. This product is soluble in oils and synthetic lubricants. Study of the product by nuclear magnetic resonance shows that the carbonyl is present chiefly as an aldehyde. There also appear to be some keto groups present.

Example 3

(a) A mixture of 60 parts of a polyolefin of a molecular weight of about 1200 derived from a fraction of polyolefins from propene through pentenes, 270 parts of ethanol, and 270 parts of n-hexane is treated with ozone at —70° C. The ozone is supplied in a stream of oxygen at the rate of 1.45 millimoles per minute until an aliquot shows 0.05 mole of peroxide has been formed.

(b) About one half part of platinum oxide is added to the above reaction mixture. While the mixture is kept at about 0° C., hydrogen is supplied until on titration of an aliquot with hydroxyamine there is a content of 0.04 mole of carbonyl. The mixture is filtered and mixed with di-2-ethylhexyl sebacate and heated to 100° C. under a pressure of 5 mm. absolute pressure. There was thus prepared a 20% solution of the carbonylated polymer, which had a viscosity of 7.34 cs. at 210° F.

Example 4

(a) A mixture is prepared from 100 parts of a commercial polybutene of a molecular weight of about 1200, 400 parts of n-heptane, and 30 parts of methanol. Temperature of the mixture is adjusted to about 3° C. and ozone in oxygen is passed in at the rate of 1.46 millimoles per minute for 50 minutes.

(b) The above solution is treated with two parts of a platinum hydrogenation catalyst held at 0° to 10° C., and reacted with .08 mole of hydrogen.

The mixture is then filtered and solvent evaporated to give a residue of 98 parts which contains 86% of the theoretical carbonyl groups which may be introduced into this polymer.

For purposes of comparison a mixture of 60 parts of the polybutene used in Example 4 and 160 parts of heptane is treated with ozone in air at the rate of 1.45 millimoles of ozone per minute for 30 minutes. The solution is heated under reflux for 16 hours to decompose peroxides. Solvent is evaporated to give the product as a residue. By infrared analysis it is found to contain carbonyl groups, but ony 53% of the theoretical carbonyl groups are present.

Example 5

(a) A mixture is prepared from 600 parts of the polybutene used just above, 800 parts of toluene and 320 parts of methanol. It is kept at about 5° C. and treated with ozone for 300 minutes at the rate of 1.45 millimoles per minute.

(b) To the resulting solution is added 30 parts of a catalyst consisting of 5% palladium on carbon. Hydrogen is introduced at 55° C. while the mixture is agitated. When the rate of addition of hydrogen slows up, the solution is filtered and the product is obtained after the sovent is removed by heating. The product is found to contain 1.46% of oxygen. Theory for one oxygen per unit of 1200 molecular weight is 1.33%. The product is a viscous liquid.

Example 6

The procedures of Example 5 are repeated starting with a mixture of 200 parts of a polybutene of a molecular weight of 2400, 320 parts of hexane, and 120 parts of methanol. The same palladium catalyst is used. The final product contains by analysis 0.67% of oxygen (theory for one oxygen per unit of 2400 molecular weight is 0.67%). The product is a highly viscous liquid.

Example 7

The procedure of the above example is followed starting with 1025 parts of a polybutene of a molecular weight of 4100, 1200 parts of toluene, and 240 parts of methanol. Ozone at 1.45 millimoles per minute is supplied for 158 minutes. Hydrogen is reacted at 25° to 30° C. with the aid of the palladium on carbon catalyst. The residue is found to contain 0.31% of oxygen (theory 0.39%). The product is a viscous liquid.

Example 8

The above procedure is followed starting with a polybutene of about 330 molecular weight. After ozonolysis is carried out to about 90%, the intermediate is treated with hydrogen in the presence of palladium catalyst to give a carbonyl-containing product. Hydroxylamine titration shows a carbonyl content of 2.59 millimoles per gram of product, an 86% conversion. This product is a liquid free of color. It is soluble in esters and other oils.

Example 9

Into a solution of 120 parts of polypropene having a molecular weight of about 1200 in 450 ml. of n-heptane and 100 ml. of methanol is passed a stream of ozone in ozygen (69.5 mg. ozone/per minute) for 55 minutes while the solution is held at 0–5° C. The peroxidic products are decomposed with hydrogen using 5 parts of 5% palladium on alumina catalyst. The catalyst is removed and solvents distilled under vacuum to leave the product which has a carbonyl value of 0.632 millimole per gram as determined by hydroxylamine titration.

Example 10

Into a solution of 50 parts of polyisobutene having a molecular weight of about 2500 in 300 ml. of 50% octanol-50% decanol is passed a stream of ozone in oxygen (1.45 millimoles of ozone per minute) for 13 minutes. The solution is then treated with hydrogen in the presence of 2 parts of 1% palladium on alumina. The catalyst and solvents are removed to leave a viscous product whose infrared spectra shows a strong absorption at 1718 cm.$^{-1}$ and which has a carbonyl value of 0.18 millimole per gram as determined by hydroxylamine titration.

The carbonyl-containing aliphatic polymers prepared as above-described are useful as lubricants themselves and as additives for lubricating compositions. They may be mixed with petroleum oils or synthetic lubricants and the resulting compositions may contain other additives such as stabilizers, anti-oxidants, pour-point depressors, corrosion inhibitors, dispersing agents, oiliness agents, anti-foam agents, viscosity modifiers or anti-wear agents and combinations thereof.

In these lubricating compositions the carbonyl-containing polymers of this invention serve to increase viscosity. They also supply dispersing activity. The present polymers are employed in petroleum oils or synthetic lubricants in any amounts being completely compatible therewith. Particularly advantageous compositions are prepared by using about 0.1 to 50%, preferably 0.5 to 40%, by weight of a carbonyl-containing polymer of this invention.

A synthetic lubricant was prepared from 18 parts of a carbonyl-containing polymer of a molecular weight of about 620, 0.5 part of phenothiazine and 81.5 parts of bis(isodecyl) adipate. This composition has viscosities of 5.28 cs. at 210° F. and 25.70 cs. at 100° F., corresponding to a viscosity index of 149.

Another composition was prepared from 15 parts of the same carbonyl-containing polymer used above, 0.5 part of phenothiazine, 0.75 part of phenyl-α-naphthylamine, 1.3 parts of a copolymer from a mixture of 40% butyl methacrylate and 60% lauryl-myristyl methacrylate and 82.55 parts of bis(isodecyl) adipate. This composition has viscosities of 5.27 cs. at 210° F. and 25.36 cs. at 100° F., giving a viscosity index of 151. These compositions are useful in turbo jet and turboprop engines.

Another lubricating composition is prepared from 10 parts of the carbonyl-containing polymer from polybutene with a molecular weight of about 800, one part of phenothiazine, 0.03 part of sebacic acid and bis(isoctyl) adipate to make 100 parts. The viscosities of this mixture are 4.17 cs. at 210° F. and 16.37 cs. at 100° F., corresponding to a viscosity index of 181.

A lubricating composition is prepared from 10 parts of the carbonyl-containing derivative of a polybutene of a molecular weight of 2,400, one part of 4,4'-methylene-bis-(2,4-di-tert-butylphenol), and 89 parts of a 170 neutral oil prepared from mid-content stock with solvent extraction. This composition has viscosities of 10.60 cs. at 210° F. and 83.23 cs. at 100° F., corresponding to a viscosity index of 117.

Lubricating compositions are prepared by blending (1) 20 parts of a polybutene of a molecular weight of 1200 with 80 parts of di-2-ethylhexyl sebacate containing 0.025% of free sebacic acid, (2) 20 parts of the saturated polymer obtained from the same polybutene by hydrogenation and 80 parts of the same preparation of di-2-ethylhexyl sebacate and (3) 20 parts of the carbonyl-containing polymer derived from the above polybutene by the method defined above and 80 parts of the same preparation of di-2-ethylhexyl sebacate.

Properties of these blends are summarized in Table 1.

TABLE I

| Properties of blends | 1 | 2 | 3 |
|---|---|---|---|
| Viscosities in cs. at — | | | |
| 210° F | 7.23 | 7.10 | 7.32 |
| 100° F | 36.36 | 35.58 | 36.55 |
| −40° F | 9,916 | 9,582 | 9,811 |
| Pour point (° F.) | −50 | −55 | −70 |

The lower pour point (determined by the A.S.T.M. method) for blend 3 demonstrates the greater compatibility of the carbonyl-containing aliphatic hydrocarbon polymers and one of the substantial advantages thereof.

A commercial polybutene of molecular weight of about 440 is ozonized according to Example 5. One portion of the ozonized solution is treated according to Example 5(b) and a second portion according to Example 11. Both are stripped of solvent and tested for their ability to dissolve asphaltene sludge.

One half ml. of chloroform containing 10 mg. of asphaltene sludge is added to 5 ml. of each of the carbonylated polybutene preparations in a test tube. The chloroform is removed by heating in an oven. The sludge precipitates from the polybutene solution but not from the carbonylated polybutene liquids. Incremental amounts of sludge are added until a precipitate forms. A summary of these data is below.

| | Polybutene (molecular weight about 440) | | |
|---|---|---|---|
| Treatment with ozone | None | (¹) | (¹) |
| Post ozone treatment | None | (²) | (³) |
| Carbonyl value (hydroxylamine method millimoles per gram | Nil | 1.57 | 1.30 |
| Centistokes at 210° F | 10.71 | 12.35 | 16.30 |
| Mg. sludge/5 ml. fluid | <10 | 120 | 120 |

¹ As in Exam. 5.
² As in Exam. 5b.
³ As in Exam. 11.

We claim:
1. A lubricating composition comprising an oily dialkyl ester of a dicarboxylic acid having dissolved therein a pour point reducing amount of an oil-soluble hydrocarbon polymer having a molecular weight of about 300 to about 5000 and bearing a carbonyl group, said polymer being made by reacting an olefinic polymer which is derived from an olefin containing 3 to 12 carbon atoms and which has a molecular weight of about 300 to 5000 with ozone until an ozonolysis product is formed and reducing the resulting ozonolysis product until a carbonyl group is formed thereon.

2. A lubricating composition according to claim 1 wherein said hydrocarbon polymer is a polybutene polymer having a molecular weight of about 300 to about 5000 and bearing a carbonyl group.

3. A lubricating composition according to claim 1 wherein said olefin contains 3 to 5 carbon atoms.

References Cited

UNITED STATES PATENTS

| 2,250,468 | 7/1941 | Cockerville | 252—55 X |
| 2,251,550 | 8/1941 | Lieber | 252—52 X |
| 2,334,996 | 11/1943 | Davis | 252—55 |
| 2,824,131 | 2/1958 | DiNardo | 252—55 |
| 2,992,987 | 7/1961 | Fields | 252—56 |

DANIEL E. WYMAN, *Primary Examiner.*

W. H. CANNON, *Assistant Examiner.*

U.S. Cl. X.R.

252—55, 56; 260—452